US006502127B1

(12) United States Patent
Edwards et al.

(10) Patent No.: US 6,502,127 B1
(45) Date of Patent: Dec. 31, 2002

(54) COMPUTER EMAIL WITH TELEPHONY SUPPORT

(75) Inventors: Michael John Edwards, Romsey (GB); Amir Nathoo, Watford (GB); David Seager Renshaw, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/227,948

(22) Filed: Jan. 11, 1999

(30) Foreign Application Priority Data

May 11, 1998 (GB) .............................. 9809969

(51) Int. Cl.[7] .............................. G06F 13/00
(52) U.S. Cl. .................. 709/206; 709/238; 340/825.05
(58) Field of Search ................. 709/201, 203, 709/221, 224, 217, 206, 228, 222, 227; 707/10; 379/201, 93.17, 265; 340/825.05

(56) References Cited

U.S. PATENT DOCUMENTS

| 5,675,733 A | * | 10/1997 | Williams .................... 709/201 |
| 5,893,096 A | * | 4/1999 | Nakamura ................... 707/10 |
| 5,987,508 A | * | 11/1999 | Agraharam et al. ........ 709/217 |
| 5,999,609 A | * | 12/1999 | Nishimura ................... 379/201 |
| 6,014,688 A | * | 1/2000 | Venkatraman et al. ...... 709/206 |

FOREIGN PATENT DOCUMENTS

| EP | 0740445 | 10/1996 | ........... H04L/29/06 |
| GB | 2320843 | 7/1998 | .......... H04M/11/00 |
| WO | WO97/39564 | 10/1997 | .......... H04M/11/00 |

OTHER PUBLICATIONS

'Computer Telephony Nearing Prime Time', PTS 97202770, Jeffrey Schwartz, Communications Week, Mar. 17, 1997, p. 27.
'Web–enhanced Call Centres WHY?', Voice+, May 1998.
'Internet Voice Button' http://www.nortel.com/pcn/voice-button/works.htm printed May 6, 1998.
'The Web–Enabled Call Center: Reaching Out to the Online Community' http://www.essltech.com/press_tele_wec-c.htm—printed May 6, 1998.
'Internet Call Center' Lucent Technologies, Dec. 15, 1997.

* cited by examiner

Primary Examiner—Ario Etienne
Assistant Examiner—Khanh Quang Dinh
(74) Attorney, Agent, or Firm—David R. Irwin

(57) ABSTRACT

Office workers are equipped with a telephone and a desktop computer, the latter including an email system which allows telephony applets to be included in email messages. Thus the recipient of a message which includes an applet might typically be presented with a call back button. When this button is selected, it automatically provides the recipient with a telephone connection through to the sender of the message. This is accomplished by the applet using JTAPI to interact with the appropriate telephony equipment in order to form the desired connection.

20 Claims, 3 Drawing Sheets

COMPUTER EMAIL WITH TELEPHONY SUPPORT

BACKGROUND OF THE INVENTION

The present invention relates to communication systems, and in particular to the integration of computer email and telephony systems.

Modern office systems are equipped with two main forms of communications, namely the telephone and computer email. The telephone provides for real-time direct human-to-human contact, whilst email provides indirect contact in elapsed time. Thus email is a less spontaneous and perhaps more cumbersome interface than the telephone, but it avoids the need for the simultaneous availability of both parties and provides a readily stored record of the message exchange. Both telephony and email therefore have their relative strengths and weaknesses, and so can be used in complementary fashion, depending on the communication needs of a particular situation.

Of course, in recent years telephone networks and computer networks have developed significantly to offer many more facilities; for example, telephone networks can be used to FAX documents, whilst it is possible to embed audio data files in multimedia email messages. It is now also possible to use computer networks such as the Internet to provide very cost-effective audio connections, so-called Internet telephony (see for example the article "Dial 1-800-Internet" in Byte Magazine, February 1996, p83–88, and the article "Nattering On", in New Scientist, Mar. 2, 1996, p38–40).

Despite the increasing impact of Internet telephony however, the heavy usage of conventional telephony is unlikely to reduce much in the foreseeable future. This is due to the vast investment which has already been made in the infrastructure of the public switched telephone network (PSTN) to provide simple, reliable, and ubiquitous communications, combined with the availability of increasingly complex services on top of the PSTN such as voice mail, conferencing, etc. Note that many business locations also have sophisticated telephony switches or private branch exchanges (PBXs) which support more advanced features, such as callback requests, call forwarding, and so on.

There have previously been attempts to integrate telephony and computer services. For example, U.S. Pat. No. 5,333,266 describes a unified messaging system which allows a user to access both their email and their telephone voice messages from a computer system. Typically in the latter case the voice message might either be transmitted to the computer system as an audio file, or the user's telephone can be controlled to provide a call into the voice messaging system.

It is also known in specialized environments such as call centers to coordinate operations of the telephone and desktop computer of a customer agent. For example, the Callpath family of products available from IBM allows information about an incoming call (eg the calling or called number), which is passed into the call centre switch by the PSTN, to be sent to the desktop computer of an agent at the same time as the call itself is directed to the extension of that agent (see for example the manual IBM CallPath Call coordinator for OS/2 and Windows, reference number GC22-0074-02, 3rd edition 1994).

Call centers are also being developed to take account of the increasing prominence of the Internet and more particularly the World Wide Web as a customer interface. Thus EP-A-740445 describes a Web server from which a customer can access various pages over the Internet using a browser in known fashion. A "Call Me" button is provided for inclusion in a Web page. Responsive to the customer selecting this button, they are presented with an html form ("html"=hypertext markup language), into which they can enter their phone number and desired callback time. This form is then returned to the Web server, which extracts the call information and passes an appropriate call request to an Automatic Call Distribution (ACD) system, which in turn then places the desired call to the customer over the conventional telephone network.

An extension of this approach is the "Internet Voice Button" described at http://www.nortel.com/pcn/voicebutton, which allows a customer to select between receiving a call over the conventional telephone network, or instead over the Internet. Note that technically this latter option is actually the somewhat simpler of the two options, given that both the Web page and the audio data are being transferred over the same network using the same protocol (TCP/IP).

Another somewhat similar system is described in a White Paper by Lucent Technologies entitled "Internet Call Centre" and dated Dec. 15, 1997. As described in this document a Web Server can download a Java call control applet to start an Internet telephone call on the customer's machine into the call centre. Note that a server in the call centre acts as an interface between the Internet and the call centre telephony system, so that the call centre agents in fact use their conventional telephone extensions (rather than Internet telephones).

In view of the above art, it will be seen therefore that much of the focus on computer telephony coordination has centered around relatively specialized applications, such as Web access to call centers. There has been comparatively little attention paid to the possibility of a broader and more flexible integration. Consequently most people still regard their telephone and their desktop computer in a typical office environment as providing essentially independent methods of communication.

SUMMARY OF THE INVENTION

Accordingly, the invention provides a method of integrating computer and telephony messaging comprising the steps of:

creating an email message on a first computer system, said step of creating the email message including the step of embedding within said email message an applet for performing a telephony function;

transmitting said email message to a second computer system;

opening said email message on said second computer system, said step of opening said email message including the step of launching said applet;

and performing the telephony function of the applet.

Thus telephony functionality can now be effectively embedded into an email message, so that the two primary forms of office communication, namely email and the telephone, can be utilized in a far more integrated and effective manner than has hitherto been possible.

In order to support the telephony function of the applet, the applet may access local telephony software on the second computer system, or possibly telephony software associated with the first computer system (ie the telephony server local to the first computer system). In the latter case, there are security implications, and the method preferably further comprises the step of authenticating that the applet originated from the first computer, prior to the applet accessing telephony software on the first computer system. This can be achieved for example by a use of a digital signature, so that the receiving system can confirm the applet as "trusted", thereby enabling it to perform a wider range of activities than would otherwise be permitted.

In the preferred embodiment, the applet accesses said telephony software on the first or second computer system via a standard interface. This ensures platform independence of the approach described herein, which is important given that by its very nature email may be directed to a wide range of receiving systems. The preferred standard interface is the Java telephone interface (JTAPI). An additional benefit of JTAPI is that it allows a wide range of configurations of the underlying telephony support software, for example encompassing setting up the telephony connection from the either first or second computer system as discussed above.

Typical examples of the application of the present invention are for the telephony function of said applet to set up a telephone connection between the sender and recipient of the email message, thereby effectively functioning as a call-back, or to connect the recipient of the email message to a conference call. Generally this functionality is offered to the recipient of the email message via one or more control buttons, whereby activation of the relevant button(s) causes the applet to form the requested telephone connection.

The invention further provides an email system including:
means for creating an email message;
means for embedding within said email message an applet for performing a telephony function; and
means for transmitting said email message.

The invention further provides an email system including:
means for receiving an email message;
means for launching an applet for performing a telephony function contained within said email message; and
means responsive to said applet for implementing said telephony function.

The invention further provides an email system including:
means for creating and transmitting email messages;
means for receiving email messages;
means for embedding within said email messages for transmission an applet for performing a telephony function;
means for launching an applet for performing a telephony function contained within a received email message; and
means responsive to said launched applet for implementing said telephony function.

The email systems are typically implemented using computer program products, which are provided to customers either on a computer readable optical or magnetic storage medium or via some form of computer network, for installation on their computer systems.

The invention further provides a method of integrating computer and telephony messaging comprising the steps of:
creating an email message on a first computer system, said step of creating the email message including the step of embedding within said email message an executable component for performing a telephony function;
transmitting said email message to a second computer system;
opening said email message on said second computer system, said step of opening said email message including the step of launching said executable component; and performing the telephony function of the executable component.

The above functionality can also be supplied as a computer program product, for example as program code encoded on a computer readable medium such as a floppy disk, CD ROM, tape, and so on, or alternatively as program code made available for download over a network.

BRIEF DESCRIPTION OF THE DRAWINGS

A preferred embodiment of the invention will now be described in detail by way of example only with reference to the following drawings.

DETAILED DESCRIPTION

Figure 1:
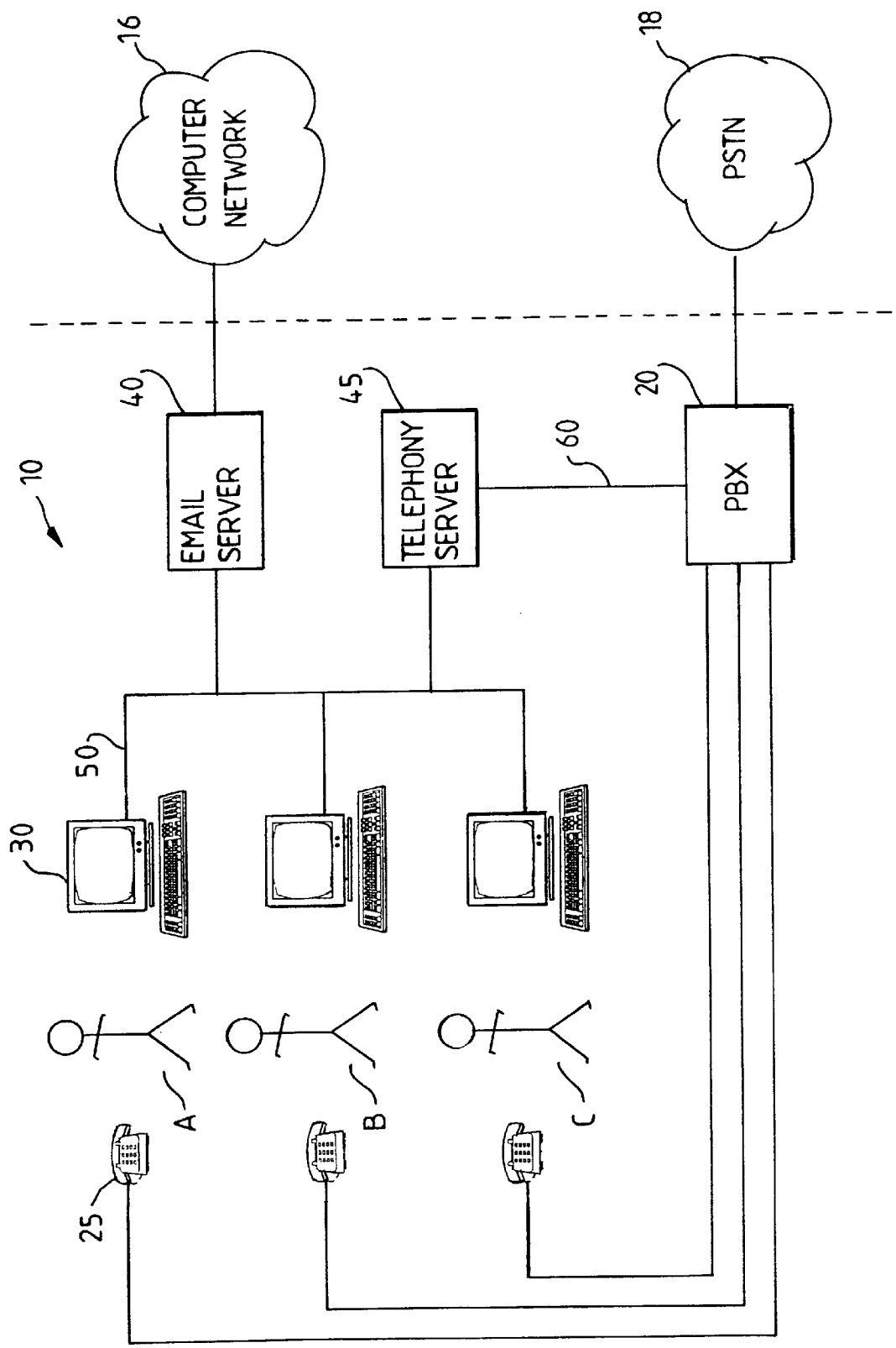
FIG. 1 illustrates the computer and telephony equipment available in a typical office environment.

FIG. 1 is a schematic representation of the computer and telephony resources available in a known office environment 10 (everything to the left of the dashed line in FIG. 1 can be found at a typical location). Thus there are multiple workers in the office, denoted A, B, C, each having their own telephone extension 25 and desktop computer 30. In conventional fashion, the telephones are connected to PBX 20, which in turn provides a connection to the PSTN 18. The desktop computers are connected via a suitable network 50 to two servers, an email server 40 and a telephony server 45. Typically network 50 is a conventional local area network (LAN). The email server is connected to a computer network 16 such as an Internet, Intranet or Extranet, whilst the telephony server is connected to the PBX by a computer telephony integration (CTI) link 60. It will be appreciated that users A, B, and C are not limited to simply communicating with one another, but may exchange messages and telephone calls with others using networks 16 and 18.

Figure 2:
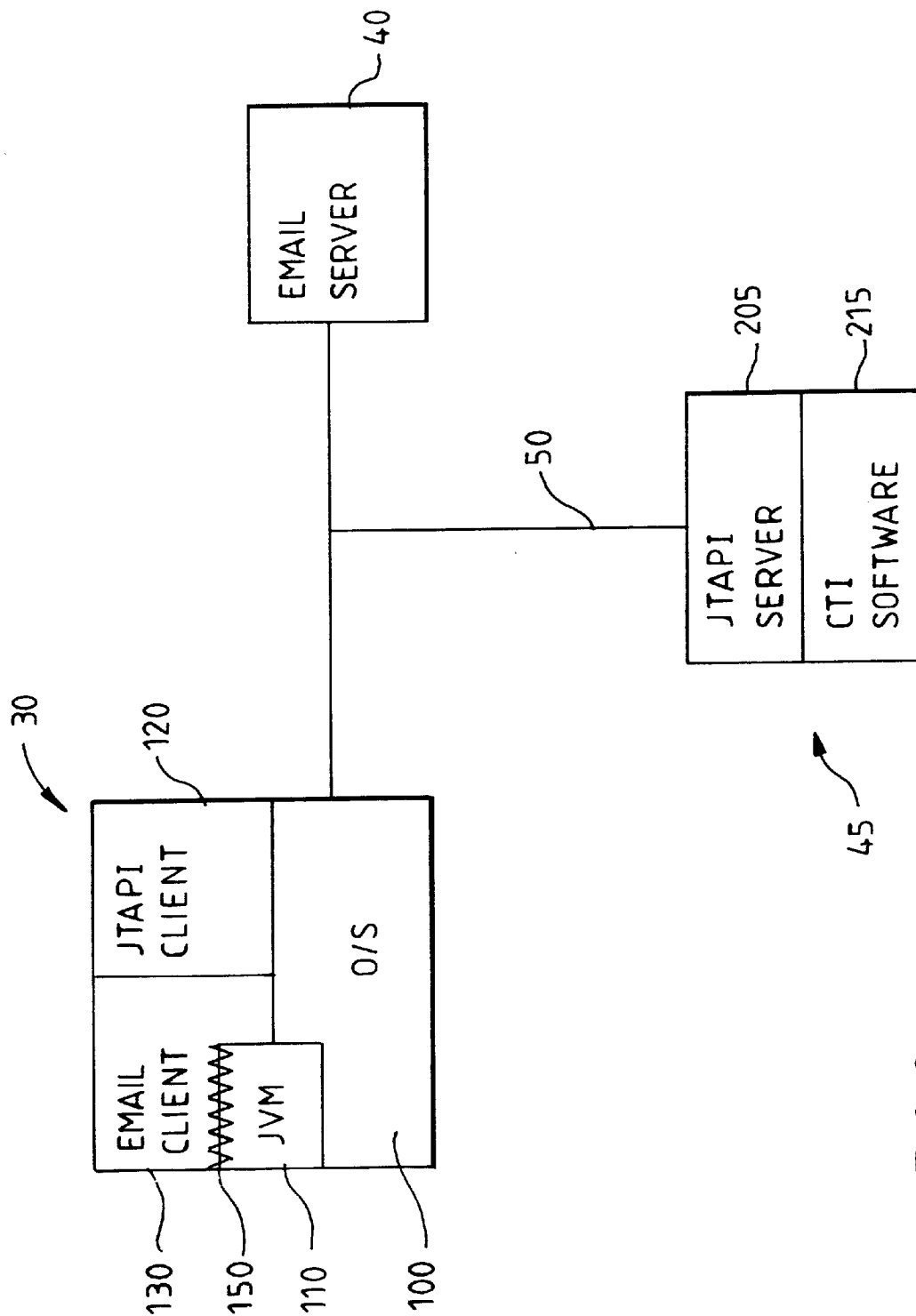
FIG. 2 illustrates the software present on the computer equipment of FIG. 1.

FIG. 2 illustrates schematically the software setup on a typical client desktop workstation 30, email server 40, and telephony server 45 from FIG. 1. Thus the client has an operating system 100, such as Windows 95 from Microsoft Corporation, or OS/2 from IBM. An email client 130 runs on top of this operating system, interacting with email server 40. Typically messages for the users A, B, C are stored on the email server 40 itself, but can be accessed from and processed by email client 130 (password protection is normally used to ensure that a user only has access to their own messages on the email server). The email client supports the Java applet interface (shown hatched as 150 in FIG. 2), which is a standard Java interface (most notably supported in browsers) that allows an environment to launch an applet, and to perform simple interactions with it, such as passing parameters into the applet.

Also shown at the client in FIG. 2 is a Java virtual machine (JVM) 110. The Java applets run on top of the JVM, which may be embedded into the operating system 100 or into the email client itself. The client further contains JTAPI client code 120 ("JTAPI"=Java Telephony API) installed locally. Note that JTAPI is a standard Java extension, and so is readily accessible from within the Java environment.

In the preferred embodiment, the email software is implemented by a Lotus Notes v4.6 environment, so that email client 130 is a Notes client, and email server 40 is a Notes (Domino) server. The Notes v4.6 product allows Java applets to be embedded into documents. These documents can then be sent from one Notes user to another by email. Note also that Lotus Notes includes its own JVM, so that any applet running out of a Notes document is contained within the Notes environment.

In order to embed an applet into a Notes document, it is necessary to design a form (this requires designer permission), the form then acting for as a template for future documents. As part of the design process, there is the option to embed an applet, including specifying the screen size to be allocated to the applet, the source of the applet code, and any parameters to be made available to the applet. Typically the applet is first created outside Lotus Notes using a suitable development tool such as VisualAge for Java, available from IBM Corporation.

Figure 3A:
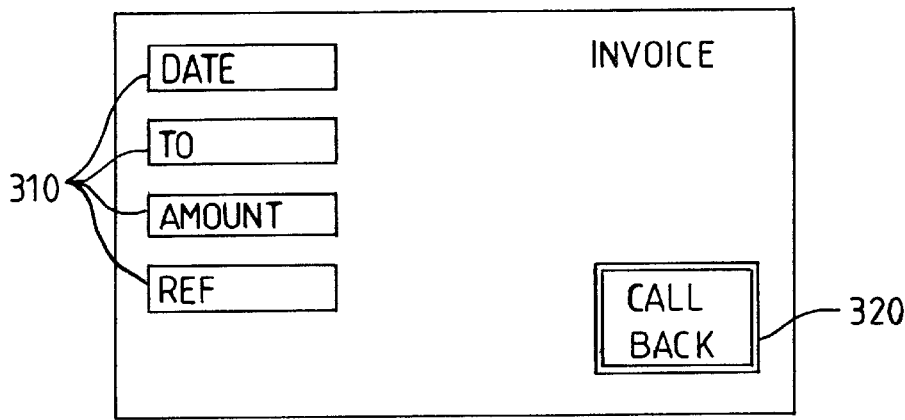
FIGS. 3A, B, and C illustrate three examples of email messages including telephone functionality.
Figure 3B:
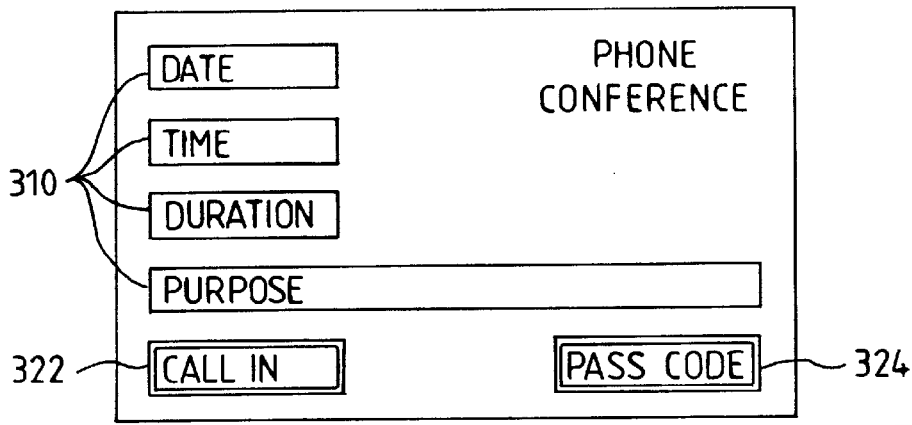
Figure 3C:
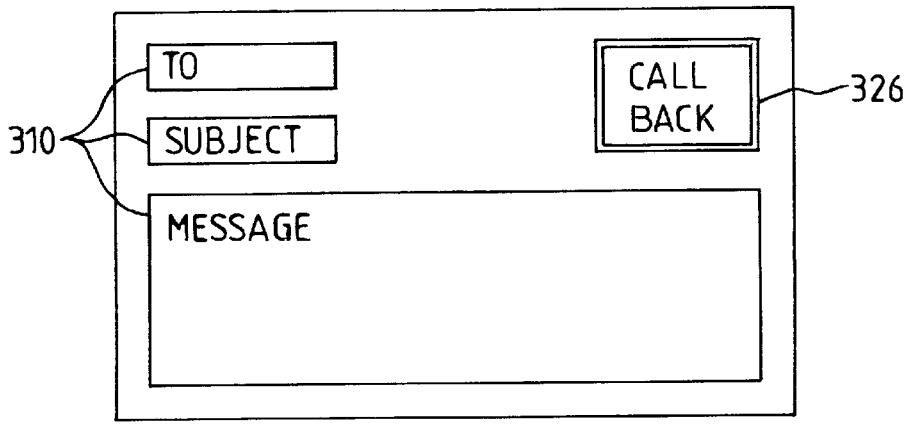

FIGS. 3A, 3B, and 3C illustrate three potential forms representing an invoice, a conference call request, and a message respectively. Each form contains a number of standard fields 310 for entering data such as the date, amount of invoice, subject of message, etc (some of these fields would typically be completed automatically by the relevant application). Each form also includes an applet, which in turn presents one or more buttons. In FIG. 3A this is a Call Back button 320; if the recipient of the invoice activates this button, then they are connected automatically by telephone to the accounts department which originated the invoice. In FIG. 3B, the applet displays two buttons, the first being a Call In button 322, which connects the recipient to the teleconferencing supplier, the second which is used to provide the relevant pass code for the conference 324. Finally, in FIG. 3C, the applet button 326 is used to connect the recipient back to the sender of the message.

Thus when one of the above forms is received, the applet is invoked by the email client, and executes to present the illustrated button to the user (it will be appreciated that generally the applet actually opens its own window, with the button being enclosed within that window; however, for the sake of clarity the windows per se are not shown in FIG. 3, only the relevant buttons). With reference to FIG. 3A for example, assuming that the recipient of the invoice activates button 320, the applet then interacts with the JTAPI client 120 (see FIG. 2) to set up the phone call back to the accounts department. In particular, the call request is passed to the JTAPI client, which in turn passes the request onto the JTAPI server 205 on the telephony server 45. This in turn processes the request by passing it onto CTI software 215 on the telephony server, which sends an instruction to the PBX 20 over CTI link 60 to make the desired connection. The call buttons in FIGS. 3B and 3C operate in substantially the same way. FIG. 3B also has a passcode button 324 presented, which includes the authorization code for the relevant telephone conference. Thus after the pressing button 322 to initially dial into the conference, button 324 can then be selected. This will instruct the JTAPI client, and through it the JTAPI server and CTI software, to place a specified sequence of DTMF keys on the line, to provide the caller access into the teleconference.

In the preferred embodiment, the JTAPI support is provided by the Callpath program available from IBM (in particular Callpath Enterprise Server, which supports the use of a Lucent G3, Nortel SL1 and DMS100, or Siemens 9751, 9005, and 9006.3 PBXs). This provides a client server JTAPI implementation, as depicted in FIG. 1, with the JTAPI server 205 effectively functioning as a Callpath daemon with the primary responsibility of converting JTAPI requests to Callpath Enterprise requests and Callpath Enterprise events and responses to JTAPI events and class exceptions respectively with respect to the underlying Callpath CTI software 215. The JTAPI client 120 which exposes the JTAPI interface to client applications such as email client 130 is a Java based toolkit, which runs on JVM 110 (the JTAPI client may run on a separate JVM from the email client, if the latter includes its own private JVM). In this implementation, the JTAPI client 120 is designed to be thin, with most of the processing delegated to JTAPI server 205.

The Callpath product set also contains a toolkit for supporting the creation of applets which exploit JTAPI, by providing a set of telephony Beans (self-describing Java components). For example, Beans are provide to represent a telephone line resource, and also operations to performed on such resources (making telephone calls and so on). It is straightforward to assemble these Beans using a graphical development tool such as VisualAge for Java to produce an applet having the desired telephony functionality, without requiring any detailed telephony expertise.

The skilled person will recognize that JTAPI allows for a wide variety of configurations which could be utilized instead of that shown in FIG. 1 (see http://java.sun.com/products/jtapi for further details on JTAPI, including pointers to the full specifications). Indeed it is one of the strengths of JTAPI that it supports conventional third party call control (such as using the CTI link 60 of FIG. 1), or first party call control (for example in locations with no PBX, or via the Internet). This helps to ensure that the message recipient is highly likely to have JTAPI support available.

Thus client 30 may directly be in control of its own local telephony, either because the client workstation itself incorporates its own telephony functionality (many modern PCs include FAX modems for example), or because the telephony service is in fact to be provided using Internet telephony or such-like over the computer network 16. In this situation there is no separate telephony server, and the JTAPI server code 205 also effectively resides on the client (such a system essentially uses represents a unified rather than client-server JTAPI implementation).

Another possibility is for the applet to directly access JTAPI functionality on a remote machine; this might be performed routinely, or perhaps only in the circumstances where the applet is unable to locate any JTAPI support on the client which receives the email. For example, in the invoice example of FIG. 3A the applet may try to contact a JTAPI implementation associated with the accounts department telephone system (again this represents a unified rather than client server structure). Knowledge of how to contact this system in terms of its network location and so on can easily be built into the applet. One implication of this approach is that the sender of the email would then typically pick up the bill for the cost of the call (this may or may not be regarded as an advantage).

A difficulty with the use of a remote JTAPI system is that the applet may not be permitted to access remote machines, dependent on the security policy of the email client. One way around this is simply to relax the security of the email client, but other more sophisticated solutions could also be adopted. For example, it is possible to add digital signatures to applets to authenticate them, allowing them to be treated as so-called "trusted" applets. Thus returning to the example of FIG. 3A, the recipient of the invoice may have agreed with its main suppliers a policy on how to authenticate the origin of any given invoice. Assuming then that the invoice is indeed verified as having originated from the proper supplier, then it would be reasonable for the client to allow the applet access to a JTAPI system associated with that supplier.

Clearly in order for the applet to perform telephony functions, the applet generally needs to know two telephone numbers, effectively the called and calling numbers. In some situations, the called number can be hard-wired into the applet; this might typically be the case with the example of FIG. 3A, where the applet be provided at creation time with the number of the relevant accounts department. However, in the example of FIG. 3C, the called number needs to vary in accordance with whoever is the originator of the message. Within Notes this is relatively easy to accomplish by passing the called number into the applet as a parameter. In the preferred embodiment, this is achieved by dynamically associating the parameter with a field in the form (for example, in the case of FIG. 3B, this would be the field marked "PHONE"). It is also possible for the applet to explicitly prompt the message recipient for the callback number (they could possibly paste it in from elsewhere in the message), although this is a somewhat less elegant approach.

As regards the calling number (ie the number of the telephone associated with the email client receiving the message), this could be included by the sender in the form, or made available as some form of environment parameter at the client system, or the applet might simply prompt the recipient to enter their own phone number. Note that the situation is simpler for direct JTAPI systems operating on single machine, since they are only concerned with the local machine (in other words there is no need to determine which PBX extension is to be associated with a particular client desktop). Of course, it will be recognized that there are many further potential techniques for obtaining telephone numbers, such as using an organization address books to determine numbers based on the sender's and recipient's email messages, although in general these may have limited portability.

The preferred embodiment has been described in the context of the Lotus Notes environment. The skilled person will appreciate that this is in fact a groupware product for document sharing, which provides an email facility as a method of communicating documents between people. Thus the ability to include applets in Lotus Notes email messages reflects the broader support for applets in Lotus Notes documents.

It should be noted that the current support for applet integration in Lotus Notes v4.6 only allows an applet to be incorporate into a document when the structure of the document is originally designed (ie when the form for that document is laid down). Thus the examples of FIGS. 3A, 3B, and 3C all represent predetermined mail templates. However, it will readily envisaged that this support could be extended using the same basic interface to enable users to integrate applets into documents on an individual basis at the time the document is created. Indeed, it would be generally advantageous for the email system to provide the user with applets for the most common functions such as call back, so that these could be directly embedded into an email message, incorporated into a signature block or whatever.

The implementation described herein exploits certain features of Lotus Notes (such as applet support and parameter passing), which are not currently available in all other mail systems, so that sending an email as illustrated in FIG. 3C for example outside Notes may not preserve the telephony function. However this is essentially a standardization problem, rather than a reflection of any underlying technical difficulties. Thus it is clearly a desirable feature of email that it can be readily processed by a wide variety of recipients, irrespective of the systems that they use (and note that there is typically no way to determine or ask in advance of message transmission what type of system a particular intended recipient has). This is why Internet email systems follow the Simple Mail Transport Protocol (SMTP), based around straightforward ASCII text. However, on many occasions the limitation to ASCII is unduly restrictive, and so it is already very common to integrate other components into SMTP email messages by encoding them as ASCII. Most email systems for example handle so-called MIME extensions, which allow images and so on to be incorporated into email messages. It is also increasingly common for email systems to support embedding html into email messages, and this combined with support for the Java applet interface provides a mechanism for other email systems to handle the telephony applets described herein, since they can now be included in an html page attached to an email message. Nevertheless, the integration of an applet straight into an email as described herein (rather than via an html page) represents a particularly powerful and flexible approach, and one which is especially amenable to applications such as depicted in FIGS. 3A, 3B, and 3C.

A significant aspect of the preferred embodiment is the use of standards such as the Java applet interface and JTAPI. This follows from the objective of ensuring that the telephone functionality will operate correctly irrespective of the destination of the email message in which it is included. To this end, the overall solution described herein is therefore platform independent, and so ideally suited to deployment in an email environment.

The skilled person will recognize however that there may be circumstances in which it is acceptable to lose some of this platform independence, for example for internal company communications, where the company has a substantially homogeneous computing and telephony environment. An example of such an alternative embodiment would be where the telephony functionality is embedded into the email using Active X controls, which are then processed by the email client to interact with the telephony server (probably using the Microsoft TAPI interface). One bonus of such an approach would be the possibility for tighter integration between the email system, embedded executable object (applet), address book, calendar, and so on (eg messages directed to someone in an address book might automatically pick up their telephone extension for inclusion in the email applet). Again such enhancements would be unlikely to survive transmission into an external environment.

Although the telephony functions described herein have been relatively simple (eg the call-back function of FIGS. 3A and 3C), it will be appreciated that there is no real limit on the complexity of an applet, and so many extensions are possible. Simple examples are that the applet may be programmed to try second and third numbers, etc, for the "call me back" function, if the first number does not succeed (eg office, mobile, home), or perhaps to try different numbers dependent on time and so on. It may also be possible for the applet to access calendar information to determine a current location and number to call. As another example, the applet of FIG. 3A might offer a range of numbers to call, dependent on the nature of the query (technical, financial, sales, etc), or the type of product involved. As yet another example, a button might also offer the possibility of calling one or more of the people copied on an email message. Thus it would be possible for the applet, if so requested, to ring each one of the message addresses in turn, to join the calls together (telephony system permitting), and to therefore provide a telephone conferencing function from perhaps just one simple button.

What is claimed is:

1. A method of integrating computer and telephony messaging comprising the steps of:

creating an email message on a first computer system, said step of creating the email message including the step of embedding within said email message an applet for performing a telephony function;

transmitting said email message to a second computer system;

opening said email message on said second computer system, said step of opening said email message including the step of launching said applet; and said embedded telephony applet accessing telephony software on the second computer to perform the telephony function of the applet.

2. The method of claim 1, wherein said step of performing the telephony function of the applet comprises the step of the applet accessing telephony software on the second computer system.

3. The method of claim 1, wherein said step of performing the telephony function of the applet comprises the step of the applet accessing telephony software associated with the first computer system.

4. The method of claim 3, further comprising the step of authenticating that the applet originated from the first computer, prior to the applet accessing telephony software on the first computer system.

5. The method of claim 2, wherein the applet accesses said telephony software on the second computer system via a standard interface.

6. The method of claim 3, wherein the applet accesses said telephony software on the first computer system via a standard interface.

7. The method of claim 1, wherein the telephony function of said applet operates to set up a telephone connection between the sender and recipient of the email message.

8. The method of claim 1, wherein the telephony function of said applet operates to connect the recipient of the email message to a conference call.

9. An email system comprising:
means for creating and transmitting email messages;
means for receiving email messages;
means for embedding within said email messages for transmission an applet for performing a telephony function;
means for launching an applet for performing a telephony function contained within a received email message; and
means, comprising telephony software, responsive to said launched applet for implementing said telephony function.

10. A method of integrating computer and telephony messaging comprising the steps of:
creating an email message on a first computer system, said step of creating the email message including the step of embedding within said email message an executable component for performing a telephony function;
transmitting said email message to a second computer system;
opening said email message on said second computer system, said step of opening said email message including the step of launching said executable component; and
said embedded executable component accessing telephony software on the second computer system for performing the telephony function of the executable component.

11. A computer program product including program code stored on a computer readable medium, said program code including:
means for creating and transmitting email messages;
means for receiving email messages;
means for embedding within said email messages for transmission an applet for performing a telephony function;
means for launching an applet for performing a telephony function contained within a received email message; and
means, comprising telephony software, responsive to said launched applet for implementing said telephony function.

12. An email system including:
means for creating an email message;
means for embedding within said email message an applet for performing a telephony function;
means for transmitting said email message;
means for presenting to a user said applet for embedding within said email message; and
means, responsive to the embedded telephony applet, for accessing telephony software on the email system for performing the telephony function of the applet on a remote system.

13. The email system of claim 12, wherein the telephony function of said applet operates to set up a telephone connection between the sender and recipient of the email message.

14. The email system of claim 12, wherein the telephony function of said applet operates to connect the recipient of the email message to a conference call.

15. An email system including:
means for receiving an email message;
means for launching an applet for performing a telephony function contained within said email message; and
means, comprising telephony software, responsive to said applet for implementing said telephony function, including means for accessing telephony software on a remote system.

16. An email system including;
means for receiving an email message;
means for launching an applet for performing a telephony function contained within said email message; and
means, comprising telephony software, responsive to said applet for implementing said telephony function;
wherein the applet accesses said telephony software via a standard interface on a remote system.

17. An email system including:
means for receiving an email message;
means for launching an applet for performing a telephony function contained within said email message; and
means, comprising telephony software, responsive to said applet for implementing said telephony function;
wherein the telephony function of said applet operates to set up a telephone connection between the sender and recipient of the email message on a remote system.

18. The email system of claim 17, wherein said applet operates to present a button to the recipient of the email message, wherein activation of the button causes the applet to set up said telephone connection.

19. An email system including:
means for receiving an email message;
means for launching an applet for performing a telephony function contained within said email message; and
means, comprising telephony software, responsive to said applet for implementing said telephony function;
wherein the telephony function of said applet operates to set up a telephone connection for the recipient of the email message into a conference call on a remote system.

20. The email system of claim 19, wherein said applet operates to present a button to the recipient of the email message, wherein activation of the button causes the applet to set up said telephone connection.

* * * * *